Nov. 1, 1932.　　　　A. B. MODINE　　　　1,886,292
RADIATOR
Filed Feb. 1, 1930　　　　4 Sheets-Sheet 1
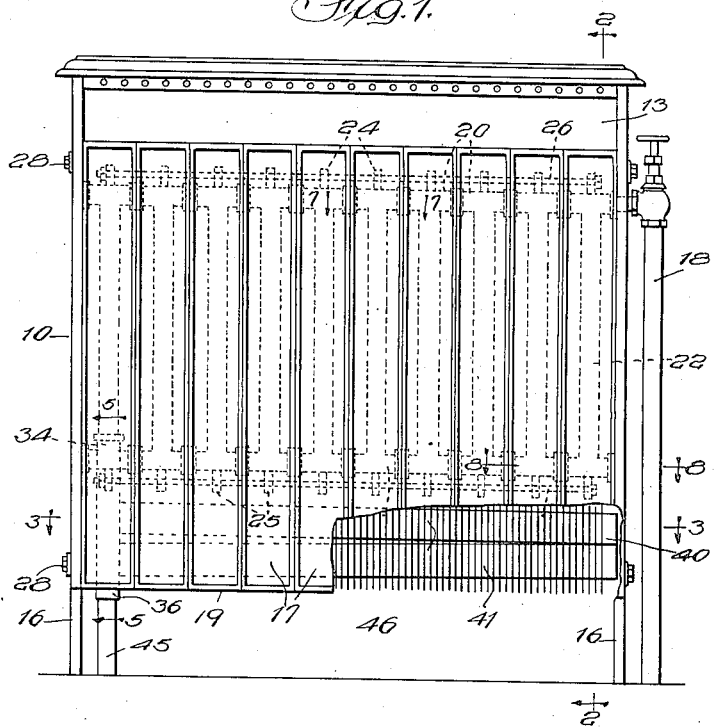
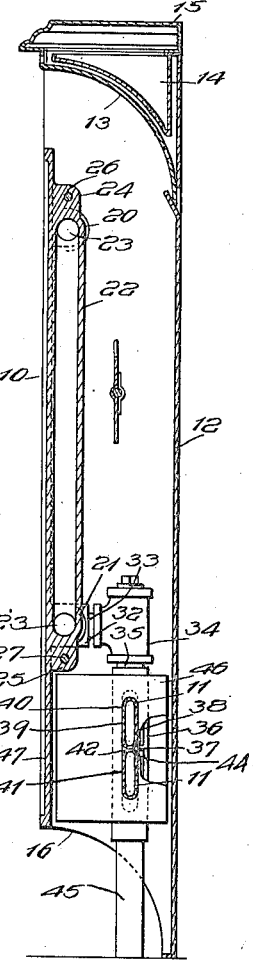
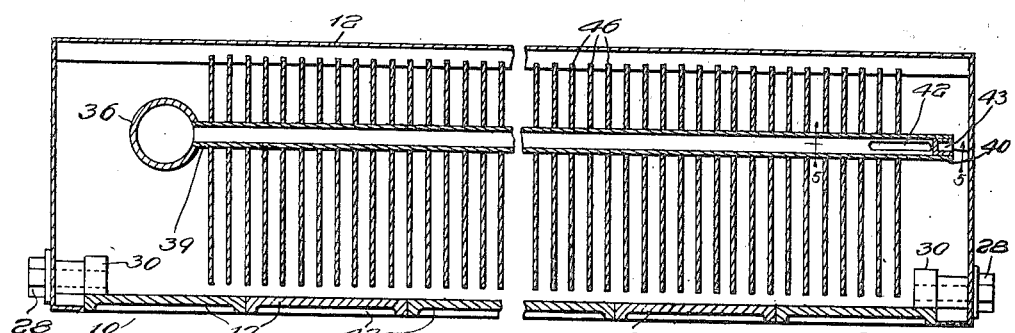
Inventor:
Arthur B. Modine
By Hill & Hill
Attys.

Nov. 1, 1932.    A. B. MODINE    1,886,292
RADIATOR
Filed Feb. 1, 1930    4 Sheets-Sheet 2
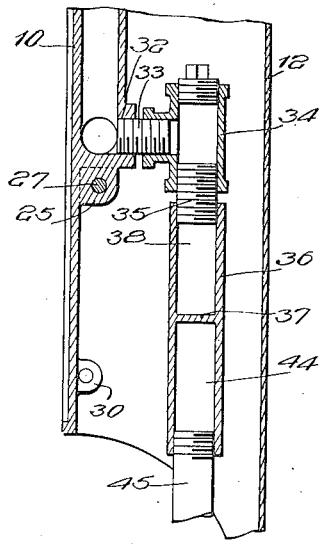
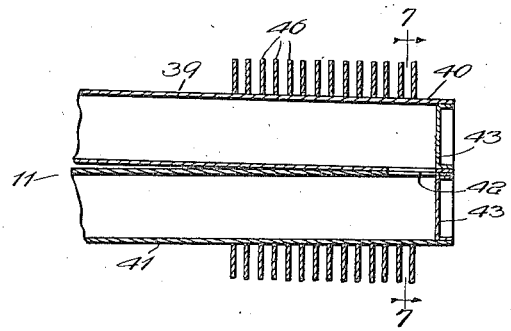
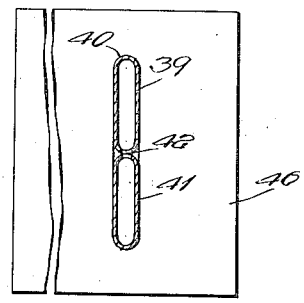
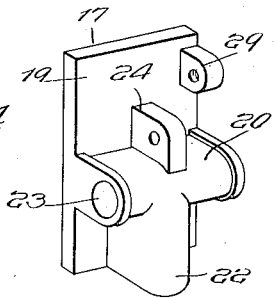
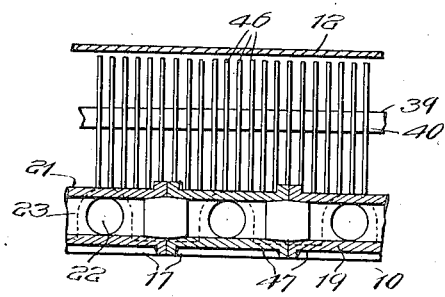

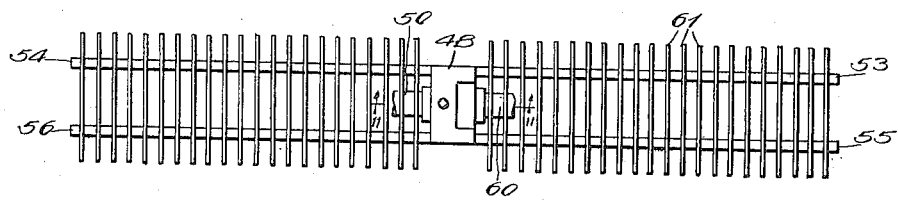
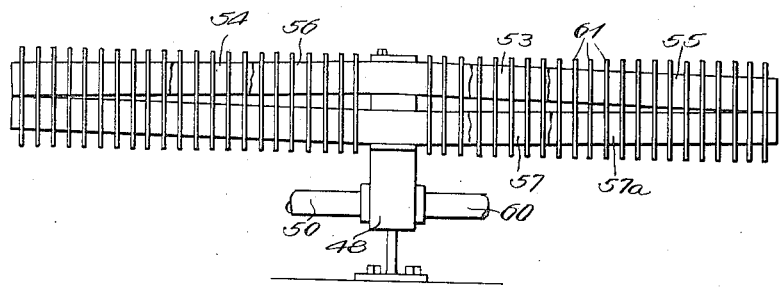
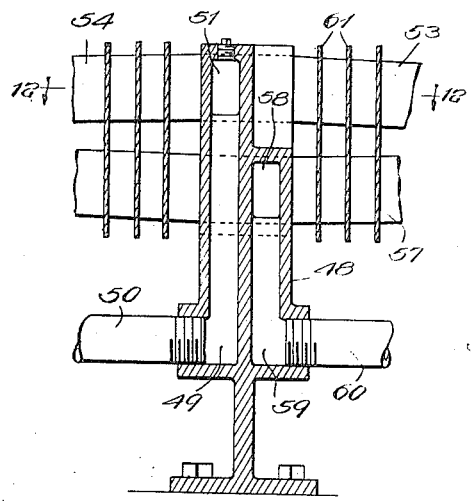
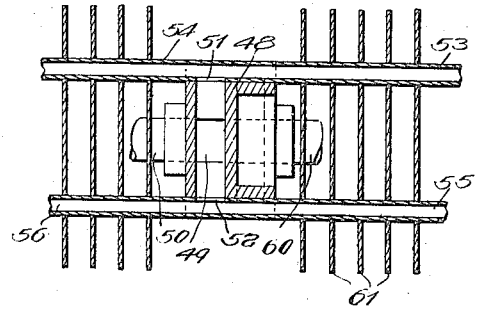

Nov. 1, 1932.          A. B. MODINE          1,886,292
RADIATOR
Filed Feb. 1, 1930          4 Sheets-Sheet 4

Witness:
William P. Kilroy

Inventor:
Arthur B. Modine
By Hill & Hill
Attys.

Patented Nov. 1, 1932

1,886,292

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

RADIATOR

Application filed February 1, 1930. Serial No. 425,158.

The invention relates to heat exchange devices and has as its principal object the provision of means for heating by radiation and also convection.

It is one of the objects of the invention to provide a device capable of accomplishing the above in which one of the heating elements is laterally offset relatively to the other and connected so that the heating medium is compelled to successively flow from one element to the other which will insure proper venting of air from the device and thus insure proper flow of the heating medium and result in increasing the heating efficiently of the device.

Another object of the invention is to provide for the free expansion and contraction of one heating element relatively to the other to thus insure against leakage and breakage at the connection provided between said elements.

It is a further object of the invention to provide a construction capable of accomplishing the above advantages in which one of the heater elements is fabricated of a number of individual heater devices which are connected with each other to provide a heater comprised of several sections and to employ a single unit as the other heating element which is connected with the former and constructed in a manner which provides for the expansion and contraction thereof, is connected therewith to properly vent the device, and serves to provide means whereby circulation of the heating medium from one to the other of the heater devices is accomplished.

The invention has as an object the provision of a heater element which is composed of a plurality or a pair of tubes, connected together at one end to allow for circulation of the heating medium from one to the other thereof, said tubes being connected to an element providing for circulation of fluid through said tubes and also through the other heater, said element providing means for supporting the tubes at one end thereof, the opposite end of said tubes being free to expand and contract relatively to said element and the other heater devices.

Another object of the invention is to arrange said elements whereby heating by radiation and convection is accomplished and are arranged relatively to each other so that when said elements are mounted in a casing, air entering said casing is compelled to pass through one of said elements, be heated thereby and thence discharged from the casing.

Another object is to construct a heater element of separate sections, each section having a heat radiating plate and incluing fluid passages connected with the plate to heat the latter, the passages providing means whereby fluid may circulate from the passages of one plate to and from the passages of another plate.

The invention has these and other objects, all of which will be explained in detail, reference being had to the accompanying drawings which illustrate various embodiments of which certain portions of the structure are susceptible, it being therefore obvious that other changes and modifications may be resorted to without departing from the spirit of the appended claims forming a part hereof.

In the drawings, Fig. 1 is a front elevation of a heat exchange device illustrating a means for accomplishing heating by radiation and convection;

Fig. 2 is a section taken on line 2—2 of Fig. 1 on a slightly enlarged scale;

Fig. 3 is a section taken on line 3—3 of Fig. 1, also on a slightly enlarged scale;

Fig. 4 is a perspective view of the rear side of one of the elements shown in Fig. 1;

Fig. 5 is a sectional view taken on line 5—5 of Fig. 1;

Fig. 6 is a sectional view of one end of the means for heating by convection;

Fig. 7 is a sectional view taken on line 7—7 of Fig. 6;

Fig. 8 is a sectional view of a fragment of the structure shown in Fig. 1 taken on the line 8—8;

Figs. 9 and 10 are respectively plan and front elevations of a modified construction capable of association with an element of the structure shown in Fig. 1 and providing means for heating by convection;

Fig. 11 is a section taken on line 11—11 of Fig. 9;

Fig. 12 is a section taken on line 12—12 of Fig. 11;

Figure 13:
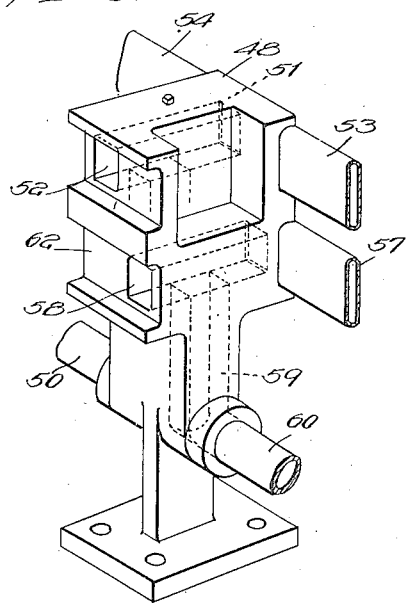
Fig. 13 is a perspective view of an element of the structure illustrated in Figs. 9 to 12.
Figure 14:
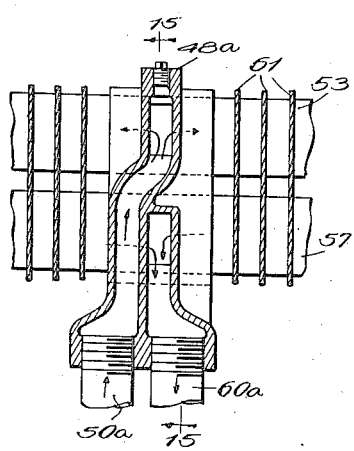
Fig. 14 is a sectional view of a structure similar to Fig. 13 showing a modified construction hereof.

The embodiment of the invention disclosed in Figs. 1 and 2 is illustrated as enclosed within a casing, which may be located in a recess provided in a wall of a building or may be arranged upon the exterior of said wall or the wall may be recessed to provide a casing for the heater elements. The structure for accomplishing heating of air by radiation is generally designated 10. The means associated therewith for heating air by convection is generally referred to by the numeral 11. These two devices may as shown be mounted within a casing 12 having the heat deflecting element 13, the humidore 14 and the top or cover 15. It will be noted that the structures generally designated 10 and 11 are arranged within the casing so that they are arranged in spaced relation to the lower end of the casing which thereby allows air to enter the casing at 16 and contact with the structure generally designated 11, become heated thereby and be discharged by convection from the casing into the room to be heated. The means for heating by radiation may be a single unit or be composed of a plurality of sections or separate elements 17 which are adapted to be connected with each other to form a unit of any capacity depending upon the amount of radiation necessary to heat a particular room. A heating fluid supply pipe 18 is connected with these several units and said units are each constructed to provide passages which allow circulation of the heating fluid from one unit to the other. As before stated, the means for heating by radiation and that provided for heating by convection are connected with each other in a manner to properly vent the heating device of air and thus facilitate flow of the heating medium. To this end, the element 10 for heating by radiation is connected in series with the element 11 provided for heating by convection. In other words, by connecting the means 10 and 11 in a manner as that just referred to, the heating fluid is compelled to travel successively from one element to another, which, it is apparent, will thus cause any air contained in the element 11 to be expelled therefrom.

By referring particularly to Fig. 4 in which one of the units is illustrated in detail, it will be evident that each of the units generally designated 17 includes a face plate 19 which is cast or otherwise formed to provide the passages 20 and 21 which are connected with each other through the medium of the passage 22. It may be here stated that each of the elements 17 is constructed as just described and that these units 17 are connected with each other through the agency of a nipple which is inserted into the openings such as 23 of the passages respectively designated 20 and 21 to thereby connect one unit with another to provide a unitary construction comprised of several of the units such as 17. It is evident that the heated fluid circulating through the passages will heat the plate and thus provide means for heating by radiation.

The units 17 may also be provided with lugs such as 24 and 25 which are apertured to receive rods 26 and 27 provided to further assist in holding the several units in connected relation with each other. A unit thus formed may be secured in any suitable manner within the casing 12, as for instance, through the agency of cap screws such as those designated 28 which are threadedly connected with lugs respectively designated 29 and 30 provided upon the endmost elements 17. It will be further noted that each of the units 17 is provided with an apron such as 31 which extends in front of the heater unit 11. It is manifest that when heating fluid is introduced to the supply pipe 18, said fluid will circulate through the passages 20, 22 and thence to passage 21 and thus heat each of the units 17.

The various units 17 are each further provided with a tubular extension 32 all of which excepting the endmost unit is closed by means of a plug (not shown), the latter being connected with the heater element generally designated 10. The means for connecting the heater elements with each other is shown in Fig. 5 and includes a nipple 33 which is threaded into the T-fitting 34 which, in turn, is connected through the medium of the nipple 35 with a pipe section 36. This pipe section 36 is provided with a dividing wall 37 which compels the heating fluid to travel from the heating element 10 into the chamber 38 and thence into the tubular leg 39 of the heating element 11.

The leg 39 is connected at one end with the passage 38 and the free end 40 of this leg is connected with a return leg 41, the legs being connected for communication with each other through the port or passage 42. It is, of course, understood that the last mentioned end of the leg 40 and the adjacent end of the leg 41 are closed in any convenient manner such as, for instance, by means of the closures 43. The opposite end of the leg 41 is connected with the chamber 44 of the pipe section 36 and this chamber is threaded to receive the heating fluid return pipe 45.

From this it can be seen that all of the heating fluid introduced to the heating elements is caused to first travel through the heating device generally designated 10 and to subsequently move into the heating device generally designated 11 which will thus effectively remove air contained in the structure which will facilitate circulation of the heating fluid and increase the capacity thereof.

By referring particularly to Fig. 1, it will be noted that one end of both legs 39 and 41 are connected with the pipe section 36 for support thereby and that the opposite ends thereof are free which will allow these leg portions 39 and 41 to freely expand and contract without resulting in breakage at the connection formed between them and the fitting 36 and the connection of the fitting with the heat radiating element 10. It is further manifest that the reverse is also true, to wit; that expansion and contraction of the part 10 is permitted without affecting the connection between the elements 10 and 11. It will be further noted by referring to Fig. 1 that the legs 39 and 41 extend substantially throughout the length of the unit formed by the several sections 17 and are arranged behind the apron or extension 31 and in the path of the air which circulates into the casing 12 through the opening 16 which will thus effectively heat the air entering the casing and cause it to be discharged and introduced in a heated condition into the room. The legs 39 and 41 are preferably provided with a plurality of heat radiating fins 46 which preferably extend from one wall of the casing to the extension or apron 31 of the unit 17. The legs 39 and 41 are preferably formed of relatively thin gauged material and are elongated in cross section; however, it is understood that this particular formation of these elements need not be adhered to.

By referring to Fig. 3, it will be noted that the front face of each of the units 17 and particularly the plate portion 19 thereof is provided with a recess 47 and that the plate is of a relatively thin gauge so that it may be readily heated through the agency of the fluid passing through the passages 20, 21 and 22 and that the air heated thereby will, by virtue of the recess 47, be conducted in an upward direction relatively to the structure.

The structures illustrated in Figs. 9 to 17, inclusive, disclose a modified construction of the means for heating by convection and differ from the construction of this structure shown in Figs. 1 to 3, 5, 6, 7 and 8 in that the heating fluid conducting legs instead of extending in one direction from their connection with the heating unit generally designated 10, extend in opposite directions, relatively to the connection and it may be here stated that the legs of the last mentioned units are bowed or inclined to facilitate drainage, flow of fluid, venting the system of air and provide means compensating for expansion and contraction.

By referring to Figs. 9 and 10, it will be seen that in the structure therein disclosed, a leg supporting head 48 is employed. This head is clearly shown in Fig. 13 and is provided with inlet and outlet passages which lead to and from the respective legs connected thereto, it being understood that one of the passages is connected with the heater unit generally designated 10 which as before stated may be comprised of the several units such as 17. The head structure 48 illustrated in Fig. 13 is shown in section in Fig. 11, from an inspection of which it can be seen that the head 48 is provided with a passage 49 to which a fluid supply pipe 50 may be connected and that this passage 49 terminates in lateral projecting passages 51 and 52, (see Fig. 13) which respectively communicate with the oppositely extending fluid conducting legs 53, 54, 55 and 56 and will thus supply heating fluid thereto. These legs 53 to 56 inclusive, are each connected at their free ends to similar fluid conducting legs such as 57 and 57a which terminate in a connection with a passage 58 provided in the head. The passage 58 has a passage 59 which, in turn, communicates with a return pipe 60 which is suitably connected with a return pipe such as that designated 45 in Fig. 2. It may be here stated that the tubular legs such as 53 and 54 may be formed of a single pipe apertured to register with the passages such as 52 and that other legs of the structure may be similarly formed. These legs may have radiating fins such as 61 similar to those previously described mounted thereon.

Figure 15:
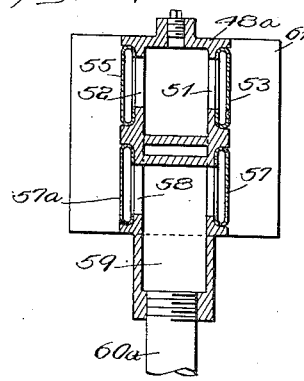
Fig. 15 is a section taken on the line 15—15 of Fig. 14.

It is understood that the tubular legs such as 53 and 57 communicate with each other at their free ends as described in connection with the structure illustrated in Fig. 6 and therefore, these legs may expand and contract freely relatively to the head without resulting in breakage at their connection with the head. The head generally designated 48 is provided with a plurality of recesses such as that designated 62 for the accommodation of the legs such as 53 to 56, 57 and other similar legs. The head 48a illustrated in Fig. 14 substantially corresponds with that described and shown in Fig. 13; however, it differs in that the supply and return pipes 50a and 60a are introduced at a different point of the head. This head is recessed as shown in Fig. 15 to accommodate the legs which extend therefrom and said legs are apertured so that communication between the head, legs, supply and return may be accomplished.

Figure 16:
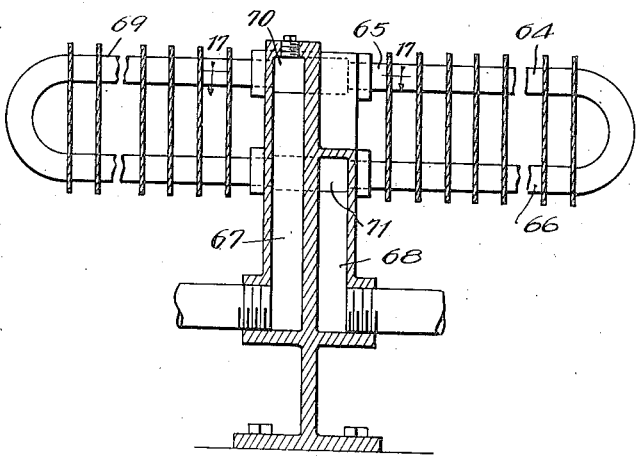
Fig. 16 illustrates a structure similar to that disclosed in Figs. 9 to 12, inclusive, however, showing a slightly modified arrangement.

In the structure illustrated in Fig. 16, an arrangement is shown which corresponds to the function and operation of the structure including the legs such as 53 and 57. This last mentioned structure contemplates the use of a plurality of elements such as that designated 64 and may be comprised of tubes, the ends of which are substantially U-shaped, which may be round or flat in cross section and has the coextending portions thereof such as 65 and 66, respectively, connected with the inlet fluid passage 67 and the outlet passage 68 by means of the respective passages 70 and 71.

Figure 17:
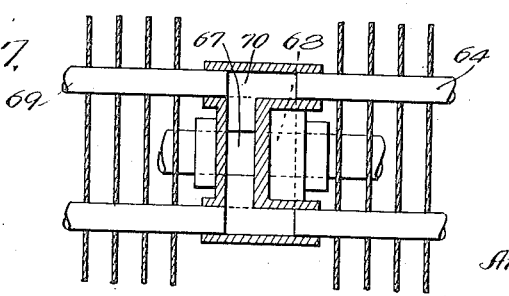
Fig. 17 is a section taken on the line 17—17 of Fig. 16.

By referring to Fig. 17, it will be noted that several pairs of legs such as 64 and 69 are employed which extend in opposite directions from the head in a manner similar to the structure described with reference to Figs. 9, 10, etc.

From the foregoing description of the invention, it is manifest that means is provided for heating air by radiation and convection, the means for heating by radiation being formed of a plurality of separate or sectional heating elements which are adapted to be connected with each other to provide a unit composed of several of said elements, which has means combined therewith for heating by convection, the two heating elements being connected with each other so that the heating fluid introduced thereto is successively introduced from one to the other. It is further evident that the means for heating by convection embodies a construction which allows the heating fluid conducting elements or legs thereof to freely expand and contract relatively to their connection with the other heater unit which will prevent breakage and leakage at the connection. It is further evident that since these last mentioned legs are bowed or inclined, fluid flow is facilitated, expansion and contraction thereof compensated for and drainage thereof improved.

Having thus described the invention, what I claim as new and desire to cover by Letters Patent is:

1. In a heat exchange device, the combination of a plurality of connected sections providing a heating unit having a fluid supply and a fluid return, a tubular member providing a heating element and a fluid passage which is common to all of said sections, said tubular member being arranged transversely of the heating unit composed of said plurality of connected sections and said tubular member being arranged adjacent the lower portion of said unit comprised of said plurality of sections.

2. In a heat exchange device, the combination of a plurality of heating elements arranged relatively to each other to provide means for respectively heating by radiation and convection, one of said elements having a plurality of fluid passages and a fluid inlet and outlet connected with said passages, the other element being tubular and having a U-shaped outline and arranged to extend along adjacent the lower edge of the first mentioned element and having one end connected with the outlet of the first mentioned member and the opposite end thereof adapted for connection with an outlet for both of said elements.

3. In a heating exchange device, the combination of a plurality of heating elements arranged relatively to each other to provide means for respectively heating by radiation and convection, one of said elements providing a wall of a vertically extending air passage of said heat exchange device and having a fluid inlet and a fluid outlet, the other element including co-extending tubular members communicating with each other at one end and having one extremity of the opposite end fixedly connected with the outlet of the other member and the other extremity of said last mentioned end adapted for connection with an outlet for both elements to thereby provide means permitting expansion and contraction of the co-extending tubular members said co-extending tubular members being located in said vertically extending air passage.

4. A heat exchange device composed of a plurality of members providing means for transferring heat, each member being comprised of a plate, tubular elements connected with the plate providing a fluid supply and a fluid return, and a tubular portion connecting said supply and return, the tubular elements providing an element of means whereby one heat transferring member may be connected with another to provide a heat exchange device comprised of a plurality of said members, one of said members being provided with an element having a passage which provides means whereby another heat transfer device may be connected with a heat exchange device composed of said plurality of members.

5. A heat exchange device, the combination of a plurality of heat exchange devices arranged relatively to each other to respectively provide means for heating by radiation and convection, said heat exchange device for heating by radiation comprised of a plurality of separate connected sections, each section being comprised of a plate, passages connected with said plate, and a tubular portion connecting said passages which provide for the supply and return of heating fluid, one of said elements having means providing a communication with the tubular portion and providing means whereby said heat exchange device provided for heating by convection may be connected with the device providing means for heating by radiation.

6. A heat exchange device, the combination of a plurality of heat exchange devices arranged relatively to each other to respectively provide means for heating by radiation and convection, said heat exchange device providing means for heating by radiation being composed of a plurality of elements, each element being comprised of a plate, passages connected with said plate, and a tubular portion connecting said passages, one of said elements having means providing a communication with the tubular portion and providing means whereby said devices for heating by radiation and convection may be connected with each other, said means for heating by convection including tubular elements, one of which is connected at an end to the means for heating by radiation and having the opposite end connected with a passage for heating fluid and having a portion which is free to expand and contract relatively to the connection with the means for heating by radiation.

7. In a heat exchange device, the combination of a plurality of communicating heating elements arranged relatively to each other to provide a unit providing elements, one of which provides a wall of an air passage and means for heating by radiation and the other element providing means for heating by convection, a fluid passage connecting said elements, said last mentioned element being arranged longitudinally of the other element in the lower portion of said passage.

8. In a heat exchange device, the combination of a plurality of connected heating elements, one of which provides a vertical wall of said heat exchange device and means for heating by radiation, the other element providing means for heating by convection, each of said elements having a fluid supply and a fluid return, the return of said first mentioned element being connected with the supply of the other element, said last mentioned element having a portion which extends from said connection parallel with an edge of said element providing said wall and is free to expand and contract relatively to said connection.

9. In a heat exchange device, the combination of a plurality of connected heating elements, one of which provides a vertical wall of said heat exchange device and with a plurality of fluid passages providing means for heating by radiation, said element having a fluid supply and a fluid return, the other element providing means for heating by convection, a connection between the return of said first mentioned element and the supply of the last mentioned element, and said last mentioned element having a portion extending from said connection longitudially of one edge of said first mentioned element which is free to expand and contract relatively to said element having the plurality of fluid passages and relatively to said connection.

10. In a heat exchange device, the combination of members adapted to be associated with a casing and providing a wall of an air passage in said casing, said members being comprised of a plurality of heating elements joined with each other to provide means for heating by radiation and convection, one of said elements providing said wall and part of said passage, the other element being extended from the former into said passage and being composed of oppositely extending pairs of tubular members connected at one end with each other to form a fluid passage, and a member with which the opposite ends of each of said pairs is connected, said member providing a fluid passage between said heating elements and having a fluid passage extending therefrom.

11. In a heat exchange device, the combination of a plurality of heating elements joined with each other to provide means whereby heating medium is successively introduced and circulated through said elements and providing means for heating by radiation and convection, one of said elements providing a wall of a passage of said heat exchange device and the other element being extended from the former into said passage and being composed of oppositely extending pairs of bowed tubular members connected at one end with each other to form a fluid passage, the opposite adjacent ends of each pair being connected with each other, means providing said connection and said means providing a fluid passage between said heating elements.

12. In a heat exchange device, the combination of a plurality of heating elements arranged relatively to each other to provide means for heating by radiation and convection, one of said elements being composed of a plurality of members having means for separably connecting said members together and having a fluid inlet and a fluid outlet passage, said element providing a wall of an air passage, the other element being extended from one side of said element in the direction of said passage and including a tubular member, one termination of which is connected with one of the passages of the other element and providing a return connection for said device.

In witness whereof, I hereunto subscribe my name this 6th day of January A. D., 1930.

ARTHUR B. MODINE.